United States Patent [19]
Horiuchi et al.

[11] Patent Number: 4,897,672
[45] Date of Patent: Jan. 30, 1990

[54] METHOD AND APPARATUS FOR DETECTING AND COMPENSATING LIGHT EMISSION FROM AN LED ARRAY

[75] Inventors: Mamoru Horiuchi; Yoshinori Wada, both of Kawasaki; Hirotoshi Shimizu, Machida; Yuji Uehara; Masahiro Wanou, both of Kawasaki; Masatoshi Kimura, Ebina, all of Japan

[73] Assignee: Fujitsu Limited, Kawasaki, Japan

[21] Appl. No.: 210,335

[22] Filed: Jun. 23, 1988

[30] Foreign Application Priority Data

Jul. 2, 1987 [JP] Japan ................. 62-165794
Jul. 14, 1987 [JP] Japan ................. 62-175580

[51] Int. Cl.⁴ .................. G01D 9/42; G01D 15/14
[52] U.S. Cl. .................. 346/107 R; 346/160
[58] Field of Search .......... 346/107 R, 160; 358/302; 250/227; 350/96.1; 355/1

[56] References Cited

U.S. PATENT DOCUMENTS 4,780,731 10/1988 Creutzmann ............ 346/107 R

FOREIGN PATENT DOCUMENTS

59-226318 12/1984 Japan.
60-10967 1/1985 Japan.
WO87/02162 4/1987 PCT Int'l Appl. ............ 346/108

Primary Examiner—Teresa J. Walberg
Assistant Examiner—Scott A. Rogers
Attorney, Agent, or Firm—Staas & Halsey

[57] ABSTRACT

A checking method for a device having a plurality of light emitting elements, especially an LED array installed in electronic printing equipment. The check is done while the LED array is mounted in the equipment and does not require removal thereof. The check is done in a short time period, so it can be done during a period of page change of the printer, without disturbing the operation of the printer. Each of the LEDs are lighted one by one with a pulse. The output emission of the array is detected by a photoelectric detector which is positioned to detect the emission from any of the LEDs. The output of the detector becomes a burst of pulses, each of the pulses representing the emission property of a corresponding LED. Each pulse is converted into a digital signal and stored in a RAM as emission data. The emission data is fed back to the driver of each LED to compensate for differences in the emission characteristics of the LEDs. This improves the uniformity of the output image the electronic printer. Each time of the check is performed, the RAM is rewritten. Thereby, a change in the emission data indicates a change or degradation of one or more of the LEDs. This enables one to forecast the life expectancy of the LED array, and maintenance of the printer becomes easier.

27 Claims, 10 Drawing Sheets

METHOD AND APPARATUS FOR DETECTING AND COMPENSATING LIGHT EMISSION FROM AN LED ARRAY

BACKGROUND OF THE INVENTION

The present invention relates to a methods for checking a device having a plurality of light emitting elements. More precisely, it relates to methods for checking and regulating the emission characteristics of elements in light emitting arrays used for electronic printers.

In recent printing machines, copying machines or display equipment a plurality of light emitting elements arranged in an array. For example, in an electronic printer applying electrophotography, about 2,800 light emitting elements are aligned with a pitch of 250 units per inch on a line of about 30 cm long. These light emitting elements might be laser diodes, light emitting diodes (LED) or a liquid crystal shutter (LCS) array. Among of them, the LED array is becoming the primary choice for this application due to its low cost and quick response.

In the following disclosure of the present invention, the description refers to an LED array applied in electronic printers. Application of the invention, however, is not limited to the linear array of LEDs for electronic printers. It may be extended to any device which is provided with a plurality of light emitting elements arranged in a two dimensional matrix such as a planer solid state display device, light emitting elements also may be of any kind.

In an LED array used for electronic printers a plurality of LEDs are arranged on a line. Each LED has a size corresponding to the size of a picture element with a pitch for providing necessary resolution of the image. It is important to check the light emitting condition of these LEDs. If one LED among the units in an array is broken or degraded, the image obtained from such an LED array will include a line defect.

Further, it is necessary to bring the brightness of each LED into a predetermined tolerance in order to obtain a uniform output image. Therefore, in a practical electronic printer, the LED array is checked and the emission property of each LED element is adjusted before the array is installed into the printers. In some electronic printer, there is provided a control circuit for controlling the amplitude or pulse width of the signals during each of the LEDs, so as to compensate the tolerances of their brightness. This is done by measuring the light emitting characteristics of each of the LEDs one by one, and memorizing their characteristics in a memory device provided in the printer device. The amplifier for driving the LEDs is adjusted to vary its output pulse width or current amplitude referring to the memory. Such measurement and memorizing operation are done before the LED array is built into the printer device. More detail is disclosed in for example "High Printing Quality LED Printhead" by I. Abiko et al., Jour. of Image Technology, pp. 296–299, Vol. 12, Number 5, Oct. 1986, Society of Photographic Scientists and Engineers, or in U.S. Pat. No. 4,455,562, Jun. 19, 1984, by D. T. Dolan "Control of a light Emitting Diode Array".

Even though such correction is done, there still remains a problem. At the beginning of the operation, the output image may be fine, but the image quality as a whole degrades or fails if the LED elements degrade or fail during the operation. Since there is no way to forecast the failure of each LED element, the LED array is replaced or repaired after some defects appear in the output image. Or in some cases when defects should be avoided completely, the LED array is replaced before its total operation time exceeds the average life.

If a method is developed to check each of the light emitting elements during their operation, or during a short time interval between the operation of the electronic printer, for example during a time period of feeding a paper for a next page, extensive improvements can be expected in the quality, reliability, and maintainability of the device using such light emitting elements.

SUMMARY OF THE INVENTION

An object of the present invention, therefore, is to provide a method to check the emission characteristics of each of the light emitting elements as it is mounted in the device, without disturbing the operation of the device.

Another object of the present invention is to provide a method for checking the emission characteristics of a light emitting array mounted in an electronic printer, while the printer is in operation or during a short time period between print operations, without taking the array out from the printer.

A further object of the present invention is to improve the quality of the output image, and increase the reliability of a device using a plurality of light emitting elements aligned in a group to output the images.

A feature of the present invention is to check each of the light emitting elements using detectors of a number less than a number of the light emitting elements. In a preferred embodiment only one detector is used for checking a plurality of light emitting elements.

The principle method of the measurement is to excite all of the light emitting elements one by one in a pulsed sequence. The light emission of each element is detected by a detector which is designed to receive all of the emission radiated from the array. The output of the detector becomes a pulse train. Each pulse represents the characteristics of a corresponding light emitting element. The amplitude of the received pulse is fed back to the amplifier that drives the light emitting elements to homogenize the output light intensity. Therefore, the quality of the output image of the device is increased.

The deterioration of the light emitting elements can be anticipated from the change of the output pulse. When the change of the output pulse exceeds a predetermined tolerance, the element can be replaced before it fails. This improves the reliability of the device, and enables the use of the light emitting elements until its actual useful life end.

The measurement is done without taking the light emitting array out from the device. Further, by properly picking up the light, the operation of the device is not disturbed. Since the measurement is done very quickly, it can be done during a short time period such as a period for feeding a paper to the electronic printer for a new page.

Further detail and these or other advantages of the present invention will become apparent from the following description of preferred embodiments and accompanied drawings.

BRIEF DESCRIPTION OF THE DRAWINGS

FIG. 3 is a schematic perspective view of a photodetector suitable for the present invention, wherein:

FIG. 8 is another way to pickup the light from the LEDs using a light conducting fiber, wherein:

Throughout the drawings, same or like reference numerals designate same or similar parts.

DETAILED DESCRIPTION OF THE PREFERRED EMBODIMENTS

The disclosure is given with respect to an electronic printer using an LED array. But it will become apparent, that the invention may be applied in any type of device using a plurality of light emitting elements arranged in a group. The application can be extended over a device which combines a light source and an array of liquid crystal shutters (LCS).

Figure 1:
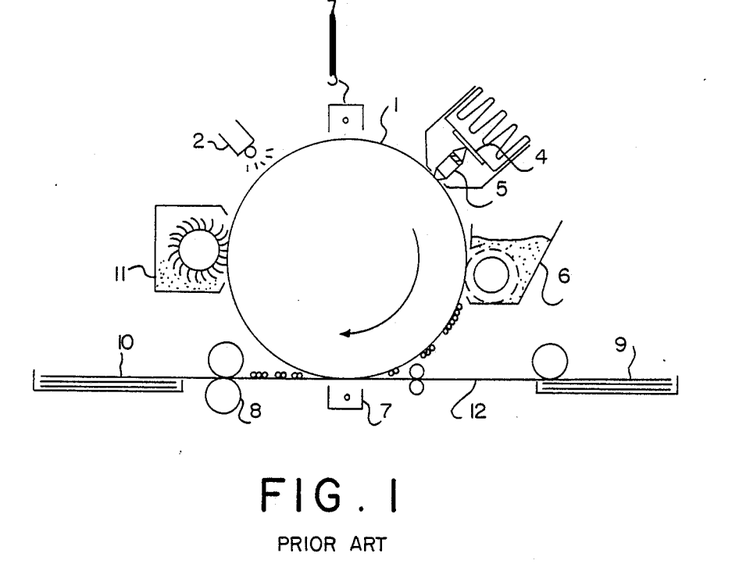
FIG. 1 is a schematic diagram illustrating the operation of an electronic printer to which a checking method of the present invention is applicable.

FIG. 1 illustrates schematically the major part of an electronic printer to explain the principle of electrophotography. This equipment is provided with a rotating drum covered with a photoconductor 1, which becomes conductive when it is irradiated by light. The drum is rotated in the direction of the arrow. The reference numeral 2 designates a discharger to sweep out the surface charges on the surface of the photoconductor 1 by irradiating light on it. The surface of the photoconductor 1 is uniformly charged up to a few hundred volts by a precharger 3. Then, a desired image is projected on the photoconductor 1 by a conventional LED array 4, which is provided with a self focusing lens array 5. By this irradiation, the photoconductor becomes conductive and discharges the surface charge leaving the charge at the portion of the image. So, a latent image composed of electric charge is left on the surface of the photoconductor 1. When the latent image arrives at a developer section 6, toner in the developer is attracted by the charge of the latent image, and adhere on the surface of the photoconductor changing the latent image to a visible one. The visible image is transferred on a paper sheet 12 by a transfer charger 7, which provides the paper with an opposite voltage charge to that of the toner and attracts the toner from the photoconductor 1 to the paper 12. The paper 12 is fed from a paper hopper 9 and stacked on a paper stacker 10. Before stacking, the toners on the paper 12 is heated and fixed on the paper 12 by a fixer 8, so as to fix the image on the paper 12. Designated at 11 is a cleaner which wipes the remaining toner from the photoconductor 1.

Figure 2:
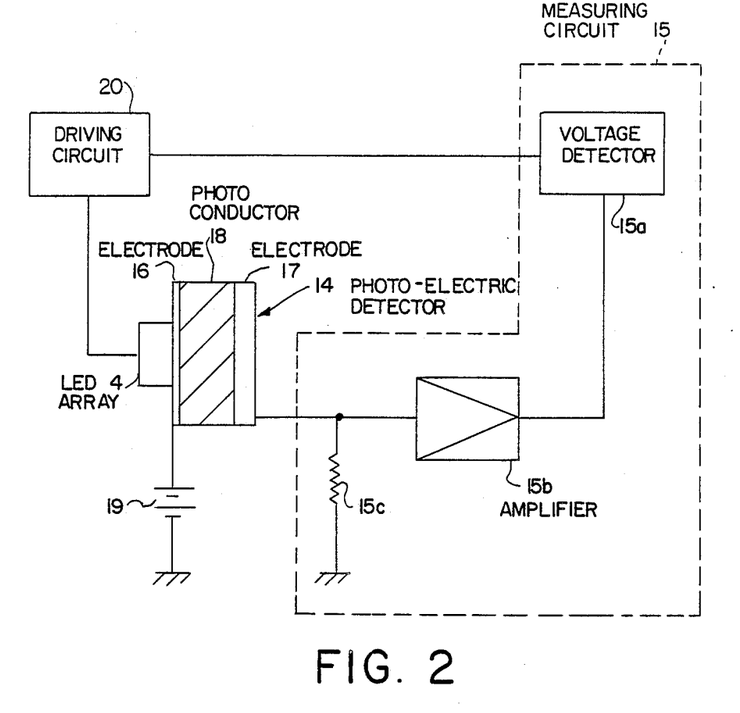
FIG. 2 is a schematic diagram illustrating the principle of how the light intensity is measured, and how it is fed back to the LED to adjust its light emission.

First, the principle method of checking LED arrays will be described referring to FIGS. 2 and 3. FIG. 2 is a block diagram illustrating the measuring method and feed back system to adjust the emission property of the LEDs. The reference numeral 13 designates an LED array according to the present invention comprising a plurality of LEDs, and 14 designates a photoelectric detector which detects the light emitted from the LED array 13, and converts it to an electronic signal. Numeral 15 is a measuring means which comprises a resistor 15c, an amplifier 15b and a voltage detector 15a. The photoelectric detector 14 is composed of a photoconductor 18 sandwiched between a front electrode 16, and a back electrode 17. Between these electrodes is applied an electric potential by a voltage source 19 through the resistor 15c and ground.

The front electrode 16 is a transparent electrode made from indium tin oxide (ITO) for example. When the LED emits a light, the photoconductor 18 becomes conductive, and current flows between the front and back electrodes. The current is converted into a voltage variation by the resistor 15c, and this voltage variation is amplified by the amplifier 15b and detected by the voltage detector 15a. This voltage is fed back to a driving circuit 20 which drives the LEDs to adjust the emission of the LED.

In order to apply the method of the present invention, it is necessary to receive the emission from each of the LED elements by a single photoelectric detector. The reason will become apparent from the disclosure to follow, but one feature of the present invention provided a photoelectric detector preferable for such purpose.

Figure 3A:
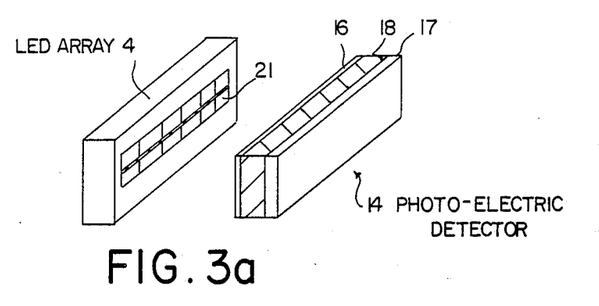
FIG. 3(a) shows components of the photo detector.
Figure 3B:
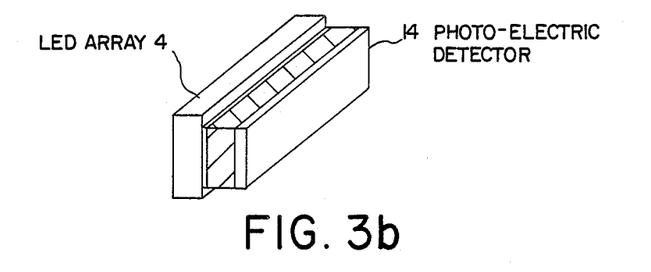
FIG. 3(b) shows a complete detector.
Figure 3C:
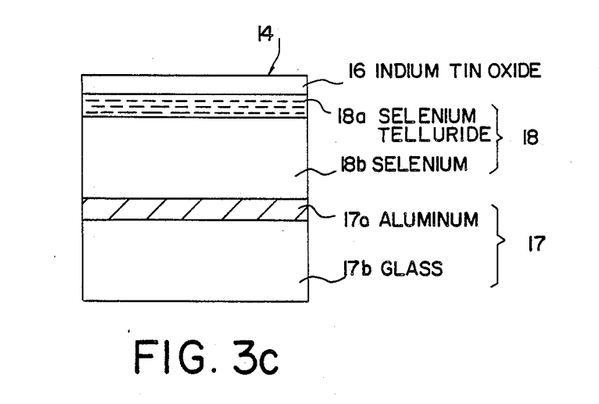
FIG. 3(c) is a cross sectional view of the photo detector illustrating its detailed structure.

FIGS. 3 (a), (b), and (c) is a schematic perspective views illustrating the photoelectric detector 14 suitable for the present invention. Numeral 13 is an LED array illustrated schematically. The LED array 13 has a plurality of LED elements 21 arranged in a line.

In FIG. 3(a), the reference numeral 14 designates the photoelectric detector of the present invention. The photoelectric detector 14 is composed of a photoconductive layer 18 sandwiched between a transparent front electrode 16 and a back electrode 17. The feature of this photoelectric detector 14 is that, it has a size suitable to cover the entire length of the LED array 13, when it is attached to the LED array as can be seen in FIG. 3(b). The detailed structure of the photoelectric detector 14 is given in FIG. 3(c) showing its cross section. The back electrode is composed of an aluminum electrode 17a of 0.5 μm thick which is evaporated on a glass substrate 17b. The photoconductor of this embodiment is composed of a double layer of selenium 18b of 20 μm thick and of selenium telluride 18a of 2 μm thick. They are subsequently deposited on the aluminum back electrode 17a, and over the selenium telluride layer 18a is formed the transparent front electrode 16 which is made of ITO of 0.2 μm thick.

The materials and structure of such a photoelectric detector are well known in the art, so, further description is omitted for simplicity. The photoelectric detector applicable to this invention is not restricted to this embodiment. So long as it responds to the wave length of the light emitted by the LED, and its size covers the entire length of the LED array. The photoelectric detector may be of any type of material, for example, it may be a photovoltaic device such as a solar cell, or a photoconductive device such as cadmium telluride and so on.

As can be seen in FIG. 3(b), if the photoelectric detector 14 is attached to the LED array 13, it receives the light from any one of the LED elements 21 in the LED array 13. Therefore, if the driving circuit 20 in FIG. 2 drives the LEDs one by one with a pulse, the output of the photoelectric detector 14 becomes a sequence of pulses. The first output pulse corresponds to the first LED, the second corresponds to the second LED, and so on. The sequence of output pulses indicates if there is a difference between the emission property of each LED, each of the output pulses representing the emission property of a corresponding LED. This is a fundamental principle of the present invention. It will be understood by the one skilled in the art that the measurement can be done within a very short period of less than a second. Of cause, the total measurement time depends on the total number of the LEDs. The output voltage of the measuring means 15 is fed back to the driving circuit 20 to adjust the driving pulses of the LEDs. The feed back is done by adjusting the voltage or pulse width for each of the LED elements to compensate for the differences in emission properties, according to the output value of the voltage detector 15a.

By such measurement, the differences in the emission properties of the LED elements can be automatically compensated quickly and easily. Further, by monitoring the output voltage of the voltage detector 15a, it is possible to determine the degradation of the LED elements. Namely, if the output pulse of the n-th pulse decreases, it means that the n-th LED is degraded. And if the degradation exceeds a predetermined limit, the element of the array should be repaired. This makes the maintenance of the device very easy. The practical measuring circuit and compensation circuit are very conventional ones in the art, so, further description is omitted.

In the above embodiment, LED measurement of the emission is facilitated by attaching the photoelectric detector 14 closely to the LED array 13. However, by properly modifying the principle described above, it becomes possible to measure the LED array in various other ways. The modification occurs in a method for picking up the output emission of the LEDs.

Figure 4:
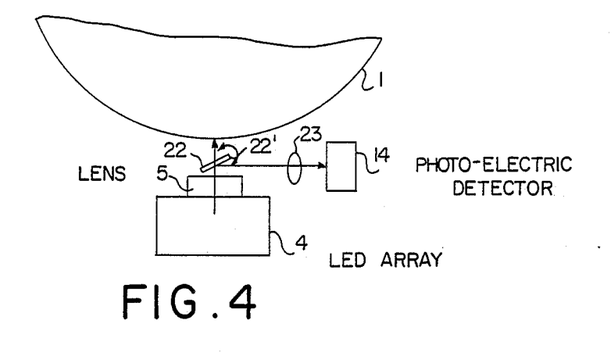
FIG. 4 illustrates schematically how the light is picked up from the light path in the electronic printer.

FIG. 4 illustrates a first method for picking up the light emission. The figure shows schematically a cross section of the relevant part of an electronic printer corresponding to FIG. 1. The LED array 4 has a plurality of LED elements (not shown) arranged vertically to the page. The light emitted by the LEDs (shown by arrows) focused by a self focusing lens 5 on the photoconductor 1 on a drum. On the light path mirror 22, which reflects a fractional part of the light and the rest of the light is transmitted through the half mirror 22. The transmitted light operates as an image projector for an ordinary electronic printer. The reflected light is focused by a lens 23 onto the photoelectric detector 14 which is similar to the one described with respect to FIG. 3. In FIG. 4, the photoelectric detector 14 is elongated vertically to the page, and detects the light emitted from any of the LEDs which are aligned also vertically to the page. The measurement and feed back of the measured data is the same as described before.

By utilizing such a configuration, it becomes possible to do the measurement without removing the LED array from the electronic printer. Measurements can be made during a very shot time period such as when feeding a paper for printing a new page. Therefore, it is possible to check and readjust the LED array each time at the start of each new printing page, without disturbing the operation of the printer. Therefore, the quality of the output image is improved.

Further, the configuration of FIG. 4 may be modified as follows. The half mirror 22 may be a mirror rotatable around an axis 22' positioned at one end portion of the mirror 22. The axis 22' is vertical to the sheet of FIG. 4. When the measurement is performed, the mirror 22 is rotated to the position shown in FIG. 4. However, in an ordinary printing mode, the mirror is rotated to a position parallel to the light path extending from the LED array 4 to the photoconductor 1. Thereby, the printing operation is not disturbed by the mirror 22. In this modification, all of the light emitted from the LED array 4 is used for the printing. Accordingly, the emission of the LED elements may be less than for the other embodiments, so, the driving current of the LEDs can be reduced, and the cooling problem typical in a high density LED array is less.

Figure 5:
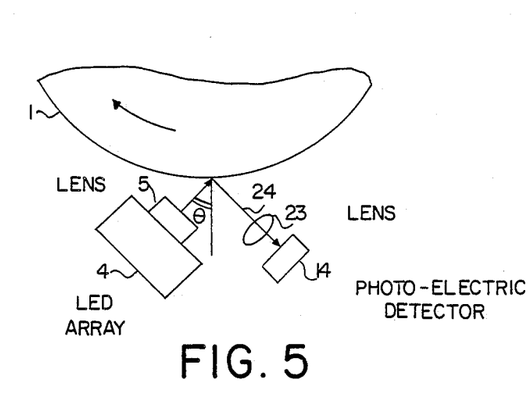
FIG. 5 illustrates schematically a second way to pick up the light using reflection from the photoconductor.

FIG. 5 illustrates the second method of picking up the light emission. The figure shows similar parts of the electronic printer shown in FIG. 4. In this embodiment, the LED array 4 and the self focusing lens 5 are positioned so as to irradiate the photoconductor drum 1 at an angle 0 inclined from the orthogonal line to the surface of the photoconductor 1. By receiving a reflected light (designated by an arrow 24) from the photoconductor 1, the half mirror 22 used in FIG. 4 has been eliminated. The operation and effect of the device is similar to that of FIG. 4.

Figure 6:
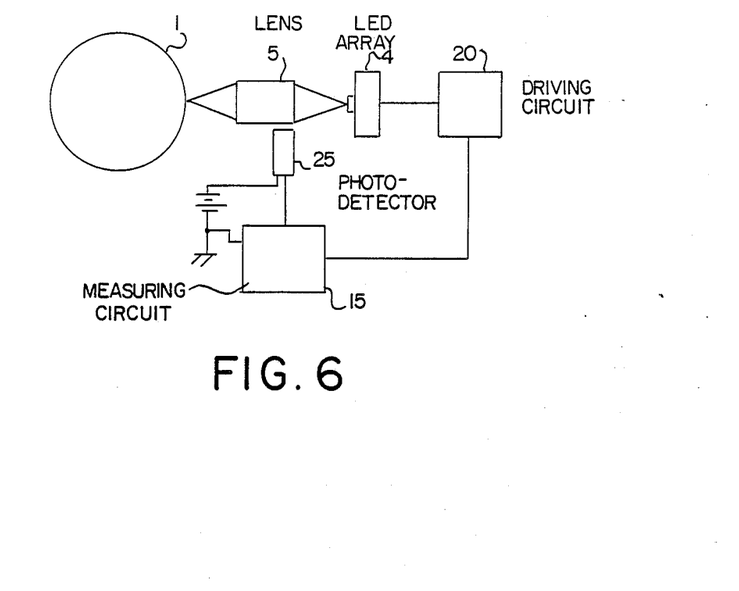
FIG. 6 illustrates a third way to pick up the light, wherein a highly sensitive photo detector is positioned aside of the light path.

FIG. 6 illustrates a third way to pick up the light emission. In this embodiment, a high sensitivity photoelectric detector 25 is positioned close to the self focusing lens 5. Not all of the light emitted from the LED array 4 is concentrated on the self focusing lens 5. Some leakage of light occurs around the self focusing lens 5. So, if a high sensitivity detector is employed or if the emission intensity of the LED array is sufficiently high, the signal proportional to the output emission of the LED can be obtained from the high sensitivity photoelectric detector 25. The measuring means 15, and the driving circuit 20 are similar to those of FIG. 2. The operation is, therefore, similar to that of FIG. 2 and other embodiments.

Figure 7:
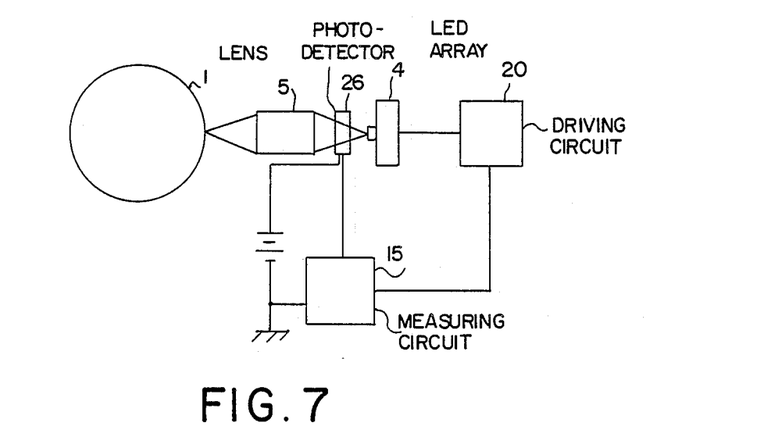
FIG. 7 illustrates a fourth way to pick up the light, using a translucent photo detector positioned in the light path.

FIG. 7 illustrates a fourth way to pick up the light emission. The feature of this embodiment is that the photoelectric detector 26 is translucent to the light emitted from the LED array 4. The translucent photoelectric detector 26 is placed in the path of the light from the LED array 4 to the self focusing lens 5. The remaining circuit is similar to that of FIG. 6. By using a translucent photoelectric detector, a part of the emission from the LED array 4 is used for the electronic printing operation. The remainder of the light which is absorbed by the detector 26 is used for checking monitoring and feed back. The circuit and effect provided by this embodiment are similar to that described with respect to FIG. 6.

The structure of the translucent photoelectric detector 26 is similar to that of FIG. 3(c). But the photoconducting layer 18 is a single layer, and both the front and back electrodes 16 and 17 are made from ITO of 0.1 $\mu$m thick. On the electrode 17a is plated on a glass substrate 17b. The photoconducting layer 18 is a single layer of arsenic selenide ($As_2Se_3$) of 2 $\mu$m thick, which is formed on the electrode 17a by a vacuum evaporation. An exemplar photoelectric detector fabricated in such a manner has a maximum sensitivity at a wave length of 670 nm of the light emitted from the LED, and a transparency of about 50%. Therefore, this photoelectric detector can be used equivalently to the half mirror 22 in FIG. 4. Accordingly, the principle and the circuit used for this embodiment are similar to those used for the foregoing embodiments such as FIG. 6.

Figure 8A:
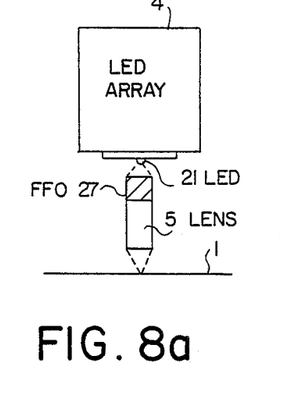
FIG. 8(a) is a front view.
Figure 8B:
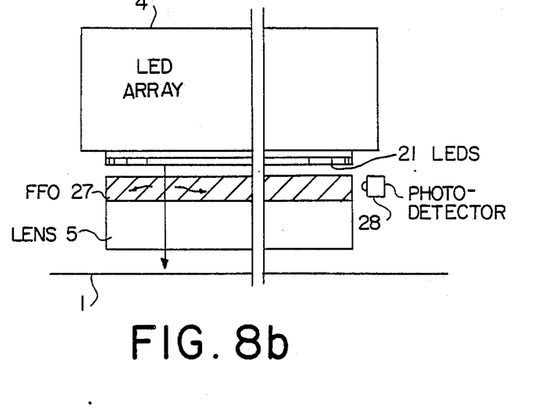
FIG. 8(b) is a side view of the device.

FIGS. 8(a) and (b) show another way to pick up the emission from the LED array 4 using a light conducting fiber. The light conducting fiber used in this embodiment is called a Fluorescent Optical Fiber FFO and sold by Fujitsu. The Fluorescent Optical Fiber FFO is made of polycarbonate resin containing an organic fluorescent material such as perylene. If light appears at a side of this optical fiber, the fluorescent material radiates a light, and this light is transmitted through the fiber. Therefore, an incidental light at a side of the fiber is detected at the end of the fluorescent optical fiber. Further detail is disclosed in Japanese patent application 62-052771.

FIG. 8(a) is a schematic front view and FIG. 8(b) is a side view illustrating the configuration of this embodiment. The LED array 4 has a plurality of LED elements 21. Between the LED elements 21 and the self focusing lens 5 is positioned an FFO 27. Most of the incidental light from the pluratily of LED elements 21 penetrates through the FFO, and is focused by the self focusing lens 5 on the photoconducting material 1. A fractional part of the light excites the fluorescent material in the FFO 27, and the radiated fluorescent light is transmitted along the FFO 27, and detected by a photodetector 28 positioned at one end of the FFO 27. The check method of the LED array is the same as in all of the foregoing embodiments. The feature of this embodiment is that, by using the Optical Fiber FFO, it is possible to use any of the conventional photo-detectors.

Figure 9:
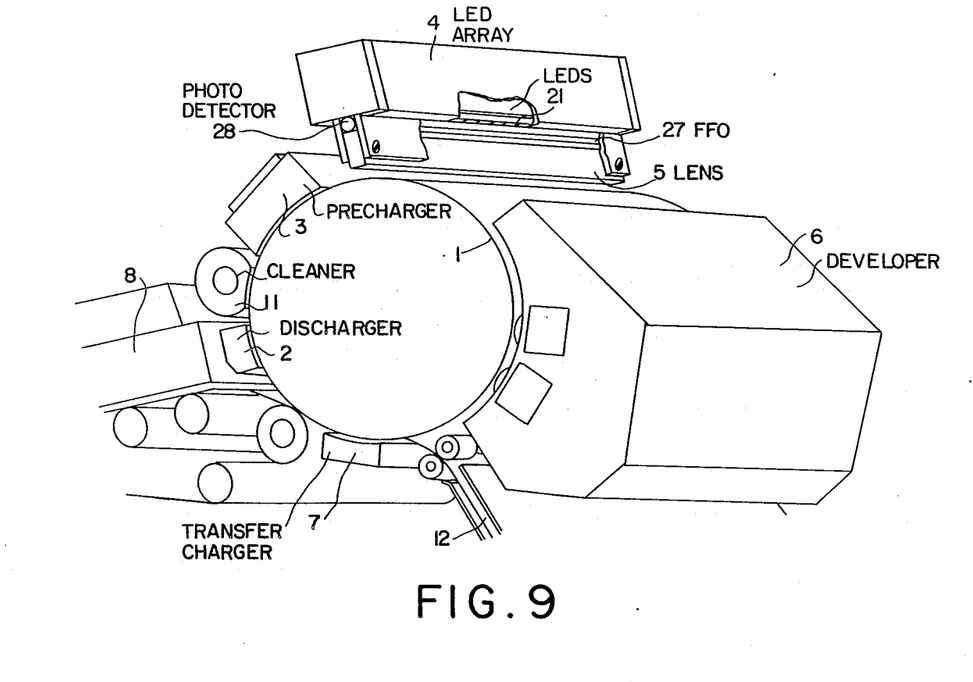
FIG. 9 is a partial cut away view illustrating configuration and positioning of major parts of an electronic printer using the present invention.

Next, a method for regulating the LED array to improve the uniformity of the output emission from all of the LED elements will be disclosed. FIG. 9 is a partial cutaway view illustrating configuration and positioning of major parts in an electronic printer applying the present invention. The figure shows an embodiment shown in FIG. 8. Adjacent the drum and photoconductor 1 is positioned a discharger 2, cleaner 11, precharger 3, LED array 4, self focusing lens array 5, developer 6, transfer charger 7, and fuser 8. The supporting means for supporting these parts and wiring are omitted for simplicity. The operation and effects of these parts are described with respect to FIG. 1. The latent image on the photoconductor 1 is developed by the developer 6, transferred onto a paper 12, and fixed thereon by the fuser 8.

In FIG. 9, a fluorescent optical fiber FFO 27 is positioned between the LED elements 21 and the self focusing lens 5. At one end of the FFO 27 is positioned a photodetector 28. It will be apparent to one skilled in the art that, the configuration and positioning of parts for other embodiments described previously can be easily under stood from this figure. For example, if the FFO 27 is replaced by a half mirror 22 or a translucent photoelectric detector 26, it may become the embodiments of FIG. 4 or FIG. 7, respectively.

Figure 10:
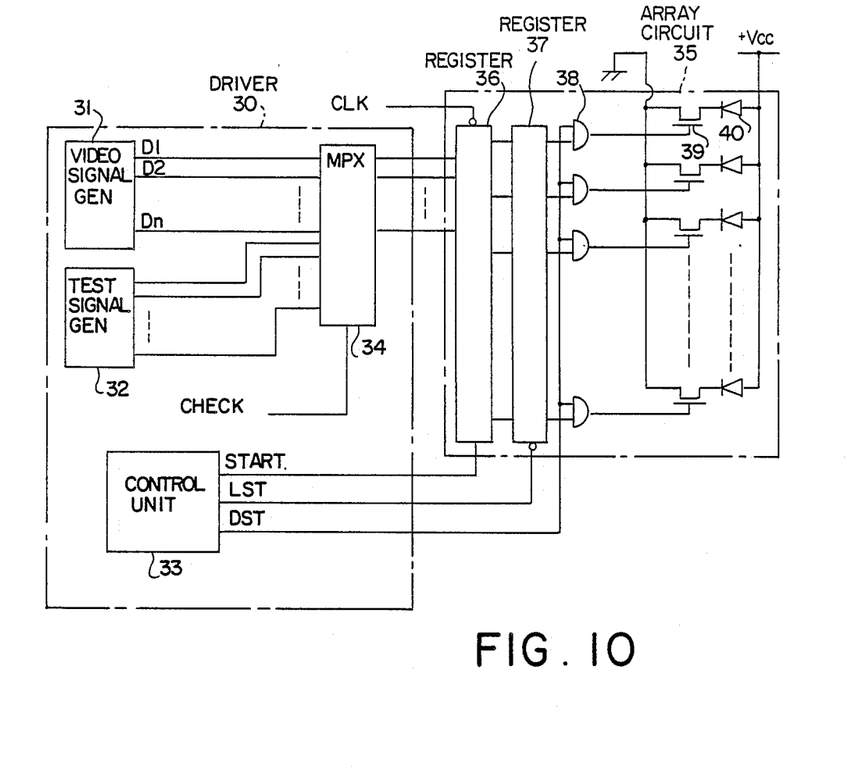
FIG. 10 is a circuit diagram for checking the light emitting characteristics of each of the LEDs which are arranged in an array used for an electronic printer.

FIG. 10 shows a circuit diagram used for checking and regulating an LED array. The circuit comprises a driving circuit 30 which controls the operation of the LED elements 21, and an array circuit 35 which is installed in the LED array 4 in FIG. 9. The driving circuit 30 includes a video signal generator 31, a test signal generator 32, a control unit 33 and a multiplexer 34. The video signal generator 31 generates binary video signals D1~Dn respectively corresponding to each of the LED elements of which the total number is n. According to this binary signal the LED elements are excited. Namely, when the signal is 1, the corresponding LED radiates an emission, and when the signal is 0, the LED is not excited. So, according to the video signal, the LED array radiates emission to generate an image on the photoconductor 1. The video signal generator 31 is a conventional one used in an ordinary electronic printer. The test signal generator 32 generates a test signal for each of the LED elements to make them radiate light one by one. The multiplexer 34 receives both the video signals and the test signals and selects one according to a check signal (CHECK), and outputs the selected signal.

Operation of the circuit in the printing mode is as follows. First, the control unit 33 outputs a start signal (START), the CHECK signal is "0", and the multiplexer 34 outputs the video signal to the array circuit 35. The array circuit 35 comprises a first register 36 which latches the input video signal data corresponding to one line element of the image, that is the dots aligned on one line of the image. When the line element is stored, the control unit 33 outputs a latch strobe signal (LST), and the data in the first register 36 is transferred to the second register 37. So, the first register 36 can accept the data for the second line element, whilst the second register 37 is processing the data for the first line element. Then the control unit 33 outputs a data strobe signal (DST). By this signal the data "1" stored in the second register 37 is sent out through AND gates 38, and opens FET (field effect transistor) gates 39. Current from voltage source Vcc runs through the corresponding LED elements 40, and the line image is projected on the photoconductor drum (not shown). These operations are conventional ones in ordinary electronic printers. So further description on the circuit and the circuit elements are omitted.

In the checking mode, the operation of the circuit is as follows. The check signal becomes "1", and the multiplexer 34 switches its output from the video signal to the test signal generated by the test signal generator 32, and sends it to the first register 36.

The test signal generator 32 is a data generator which outputs data to excite the LEDs one by one in a predetermined order. Such data may be obtained in various ways. The most simplest way may be to construct the test signal generator with a ROM (read only memory) device having n×n matrix memory, where n is the number of the LED elements. Addresses corresponding to the diagonal elements of the matrix are stored as "1" while the remaining memory address are stored as "0". Therefore, in the first row of the matrix is "10000 . . .", in the second row is "01000 ... 1". Such test data may be obtained from various other ways, for example a combination of ROM of a memory and a shift resistor.

These test data are processed by the array 35 in the same manner described above, so that the LEDs are excited one by one. Accordingly, if the output of the LED array is detected by any of the method described above, the detected signal becomes a burst of pulses. Each of the pulses corresponds to the output of a respective LED element, and represents its emission characteristics. From these output pulses, it is possible to know the degradation of each element, or it is possible to utilize feedback of the check data to improve the uniformity of the LED array.

Figure 11:
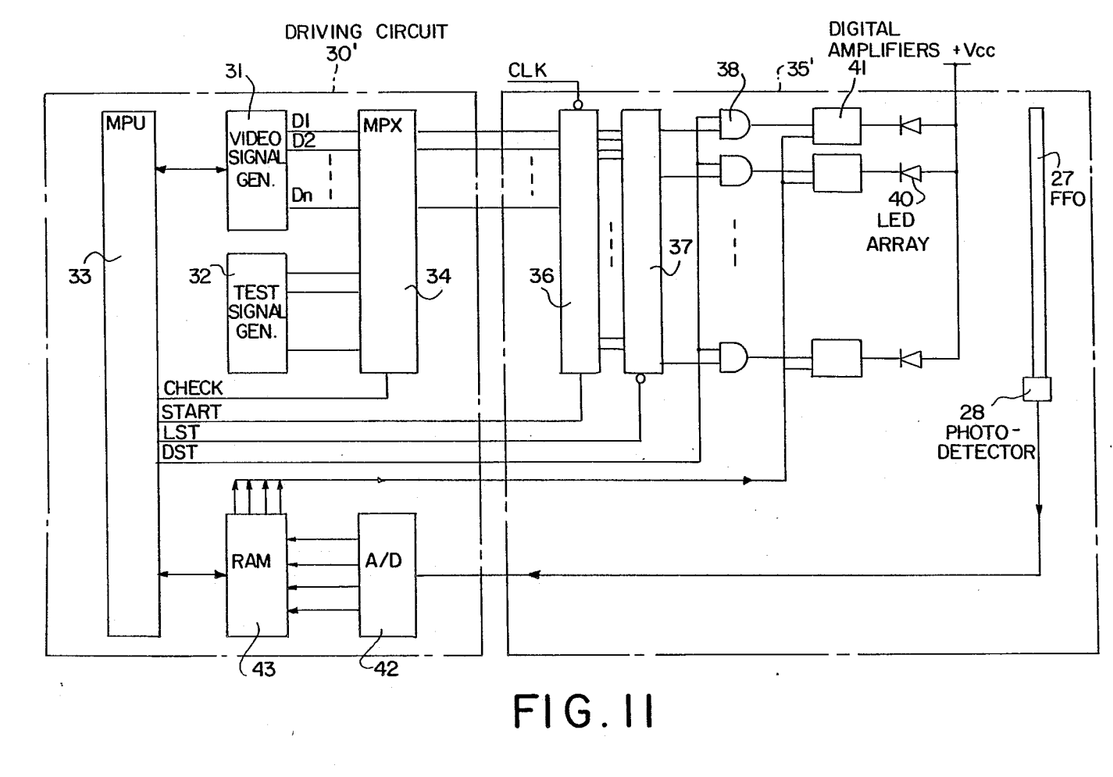
FIG. 11 is a circuit diagram for regulating the emission of LEDs using the checking data obtained by the measuring method of the present invention.

FIG. 11 is a circuit diagram for feedback of the check data to improve the uniformity of the emission characteristics of an LED array and, to improve the quality of the image obtained by the LED array. Compared with the circuit of FIG. 10, the array circuit 35' of FIG. 11 comprises digital controlled amplifiers 41, in place of the FET gates 39. In this figure, a fluorescent optical fiber FFO 27 and a photo detector 28 from the embodiment of FIG. 9 are shown. It will be apparent that they can be replaced by a photo-detector shown in any of the foregoing embodiments. In the checking mode, the photo-detector 28 sends out the pulse burst to the driving circuit 30'.

The driving circuit 30' is provided with an analog-digital (A/D) converter 42, which converts the pulse height into four bit digital signals. The pulse height signal is stored in an emission memory 43 as emission data. The emission memory 43 is a random access memory (RAM) device. In the printing mode, the emission data is output from the emission memory 43 and fed to respective digital controlled amplifiers 41 provided for each of the LED elements 40. The gains of respective digital controlled amplifiers 41 are controlled by the emission data so as to compensate the tolerance and equalize the emission from each of the LED elements.

Figure 12:
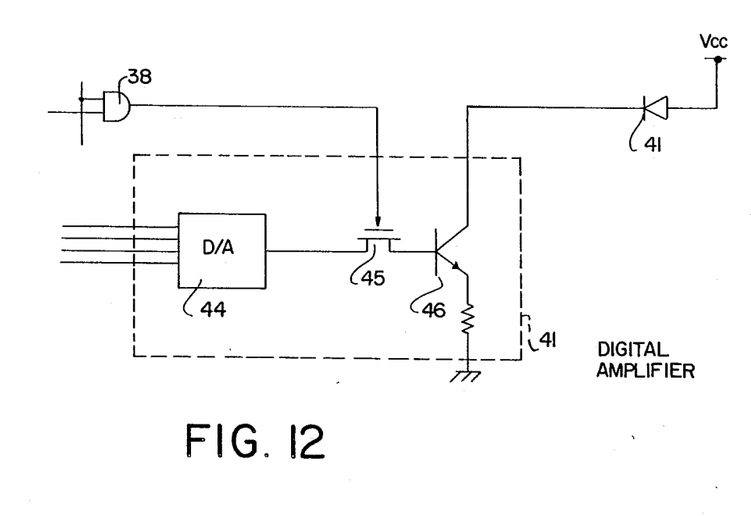
FIG. 12 shows an example of a digitally controlled amplifier applicable in the circuit of FIG. 11.

An example of a digital controlled amplifier 41 applicable to such purpose is shown in FIG. 12. The emission data is converted into an analog value by a digital-analog (D/A) converter 44 and fed to an FET 45, gate which gate is controlled by the output signal of the AND gate 38. Therefore, when the gate of the FET 45 is driven to energize the LED element, the inner conductance of a bipolar transistor varies according to the emission data. The bipolar transistor operates as a series resistance of the LED element 40. When the output pulse of the LED in the checking mode is large, the emission data is large. This increases the inner resistance value of the bipolar transistor 46 and thus the equivalent series resistance of the LED element 40 increases, so the light emission of the LED element is decreased. In such a manner, the emission from all of the LED elements are homogenized.

Such operation of the printing and checking mode is controlled by the control unit 33. Usually, once the checking is done, and the emission data is stored in the emission memory, the emission data is not replaced with new data unless some changes occur in the LED array. In other words, the replacement of the emission data means that some change has occurred in the LED array. Therefore, it is possible to provide the control unit 33 with a function to output an alarm, if it detects a change of data exceeding predetermined values. This makes the maintenance of the electronic printer easy. It also enables one to forecast of the life expectancy of array, so that one or more elements may be replaced before failing. This increases the reliability of the electronic printer.

In the above disclosure, the description has been made with respect to an LED array, but it will be apparent that the present invention may be extended to any type of array such as a laser diode array or liquid crystal shutter array combined with a light source. Further principle of the checking may be applied also to a two dimensional arrangement of the light emitting devices. The circuit configuration explained in this disclosure may be modified in various ways. They are all included in the scope of the invention.

What is claimed are as follows:

1. A method of checking a light emitting device having a plurality of light emitting elements, without removing the light emitting device from equipment using said light emitting device, said equipment having means for driving each of said light emitting elements and a target to be irradiated by radiation emitted from said light emitting elements, said emitted light defining an optical path, said method comprising the steps of:
   making all of said light emitting elements generate emission one by one with a pulse;
   detecting, aside from said optical path, said emission with means for detecting the emission from any of said light emitting elements;
   generating an output signal proportional to an intensity of incidental emission detected by said detecting means; and
   processing said output signal from said detecting means to obtain emission data representing an emission property corresponding to each of said light emitting elements.

2. A method according to claim 1, wherein said light emitting device comprises:
   one of a light emitting diode array, a laser diode array and a liquid crystal shutter array combined with a light source.

3. A method according to claim 1, wherein said equipment comprises:
   an electronic printer.

4. A method according to claim 1, wherein said detecting step comprises the substep of:
   detecting the emission with a fluorescent optical fiber positioned on a light path, and a photoelectric detector positioned at an end of said fluorescent optical fiber to detect light transmitted from the light emitting device through said fluorescent optical fiber.

5. A method according to claim 1, further comprising the steps of:
   feeding back said emission data to said driving means and compensating for differences in intensity of emission from each of the light emitting elements.

6. A method according to claim 5, wherein the light emitting device comprises one of a light emitting diode array, a laser diode array and a liquid crystal shutter array combined with a light source.

7. A method according to claim 5, wherein said equipment comprises:
   an electronic printer.

8. A method according to claim 1, wherein said detecting step comprises the substeps of:
   detecting the emission with a photoelectric detector having a size and shape sufficient to cover a light emitting surface of said light emitting device.

9. A method according to claim 8, wherein said detecting step comprises the substep of:
   detecting the emission with a half mirror positioned within a light path from the light emitting device to said target, and a photoelectric detector positioned aside of said light path to receive reflected light from said half mirror.

10. A method according to claim 8, wherein said detecting step comprises the substep of:
   receiving light reflected from said target.

11. A method according to claim 8, wherein said detecting step comprises the substep of:
   detecting a leakage emission from a light path from the light emitting elements to the target.

12. A method for checking a light emitting device having a plurality of light emitting elements, without removing the light emitting device from equipment using said light emitting device, said equipment having means for driving each of said light emitting elements and a target to be irradiated by radiation emitted from said light emitting elements, said method comprising the steps of:
   making all of said light emitting elements generate emission one by one with a pulse;
   detecting said emission with means for detecting the emission from any of said light emitting elements;
   generating an output signal proportional to an intensity of incidental emission detected by said detecting means; and
   processing said output signal from said detecting means to obtain emission data representing an emission property corresponding to each of said light emitting elements,
   wherein said detecting step includes the substep of detecting the emission with a photoelectric detector having a size and shape sufficient to cover a light emitting surface of said light emitting device, and with a translucent member positioned on a light path from the light emitting device to said target.

13. An apparatus for checking a light emitting device having a plurality of light emitting elements, without removing said light emitting device from equipment using said light emitting device, said equipment having means for driving each of said light emitting elements and a target to be irradiated by radiation emitted from said light emitting elements, said emitted light defining an optical path, said apparatus comprising:
   test generator means for making all of said light emitting elements generate emission one by one as a pulse;
   means for detecting the emission from any one of said light emitting elements, and for generating an output signal proportional to an intensity of incidental emission upon said detecting means, said detector means being set aside from the optical path from said light emitting elements to said target; and
   means for processing said output signal and for generating emission data representing an emission property corresponding to each of said light emitting elements.

14. An apparatus according to claim 13, further comprising an optical means, for leading at least a part of the light emitted from said light emitting elements to said detecting means.

15. An apparatus according to claims 13 or 14, wherein said light emitting device comprises: one of a light emitting diode array, a laser diode array, and a liquid crystal shutter array combined with a light source.

16. An apparatus according to claims 13 or 14, wherein said equipment comprises:
   an electronic printer.

17. An apparatus according to claim 16, wherein said processing means comprises:
   an analog-digital converter for converting said output signal of said detecting means into a digital signal;
   random access memory means for storing said digital output signal as emission data; and
   digitally controlled amplifiers for respectively driving corresponding ones of said light emitting elements, each of said digitally controlled amplifiers having an inner resistance controlled by said emission data.

18. An apparatus according to claims 13 or 14, further comprising:
   means for feeding back said emission data to said driving means and for compensating for differences in intensity of emission from each of the light emitting elements.

19. An apparatus according to claim 18, wherein said light emitting device comprises one of a light emitting diode array, a laser diode array, and a liquid crystal shutter array combined with a light source.

20. An apparatus according to claim 18, wherein said equipment comprises:
   an electronic printer.

21. An apparatus according to claims 13 or 14, wherein said detecting means comprises:
   a photoelectric detector having a size and shape sufficient to cover a light emitting surface of said light emitting device.

22. An apparatus according to claim 21, wherein said detecting means comprises:
   a half mirror positioned on said optical path from the light emitting device to said target, and a photoelectric detector positioned aside of said optical path to receive reflected light from said half mirror.

23. An apparatus according to claim 21, wherein said detecting means is positioned to detect reflected light from said target.

24. An apparatus according to claim 21, wherein said detecting means is positioned to detect a leakage emission from the optical path from the light emitting elements to the target.

25. An apparatus according to claim 21, wherein said detecting means is translucent and positioned on the optical path from the light emitting device to said target.

26. An apparatus for checking a light emitting device having a plurality of light emitting elements, without removing the light emitting device from equipment using the light emitting device, said equipment having means for driving each of said light emitting elements and a target to be irradiated by radiation emitted from said light emitting elements, said apparatus comprising:
   test generator means for making all of said light emitting elements generate emission one by one as a pulse;
   means for detecting the emission from any one of the light emitting elements, and for generating an output signal proportional to an intensity of incidental emission upon said detecting means, wherein said detecting means includes a fluorescent optical fiber positioned on a light path from the light emitting device to said target, and a photoelectric detector positioned at an end of said fluorescent optical fiber to detect light transmitted through said fluorescent optical fiber; and means for processing said output signal and for generating emission data representing an emission property corresponding to each of said light emitting elements.

27. An apparatus, for checking a light emitting device having a plurality of light emitting elements, without removing said light emitting device from equipment using said light emitting device, said equipment having means for driving each of said light emitting elements and a target to be irradiated by radiation emitted from said light emitting elements, said apparatus comprising:

test generator means for making all of said light emitting elements generate emission one by one as a pulse, wherein said test generator means includes a read only memory (ROM) device which has addresses composing a matrix, in diagonal addresses of the matrix are stored as "1", and other addresses are stored as "0";

means for detecting the emission from any one of said light emitting elements, and for generating an output signal proportional to an intensity of incident emission upon said detecting means; and means for processing said output signal and for generating emission data representing an emission property corresponding to each of said light emitting elements, wherein said equipment is an electronic printer.

* * * * *

UNITED STATES PATENT AND TRADEMARK OFFICE
CERTIFICATE OF CORRECTION

PATENT NO. :  4,897,672

DATED  :  January 30, 1990

INVENTOR(S) :  MAMORU HORIUCHI et al.

It is certified that error appears in the above-identified patent and that said Letters Patent is hereby corrected as shown below:

```
Col.  1, line  7, "methods" should be --method--;
         line 14, "elements" should be --elements are--;
         line 21, "Among of" should be --Among--;
         line 31, "device, light" should be --device.  The
                  light--;
         line 46, "printers." should be --printer.--;
         line 47, "printer," should be --printers,--;
         line 49, "during" should be --driving--.

Col.  5, line 30, "Of cause," should be --Of course,--;
         line 51, "LED" should be --the--; and
         line 51, "of the" should be --of LED--;
         line 64, "arrows)" should be --arrows) is--.

Col.  6, line 12, "shot" should be --short--.
         line 39, "0" should be --Θ--.

Col.  7, line  1, "checking" should be deleted;
         line  9, "On the" should be --The--; and
         line  9, "on a glass" should be --on the glass--.
```

UNITED STATES PATENT AND TRADEMARK OFFICE
CERTIFICATE OF CORRECTION

PATENT NO. : 4,897,672

DATED : January 30, 1990

INVENTOR(S) : MAMORU HORIUCHI et al.

It is certified that error appears in the above-identified patent and that said Letters Patent is hereby corrected as shown below:

Col. 8, line 62, "most" should be deleted;
line 67, "address" should be --addresses--.

Col. 9, line 1, ""01000..."1"." should be --"01000 ...", and so on, and in the n-th row is stored "0000 ... "1".--;
line 3, "of ROM" should be --of a ROM--; and
line 3, "of a memory" should be deleted;
line 4, "array 35" should be --array circuit 35--;
line 7, "method" should be --methods--;
line 43, "gate" should be deleted;
line 44, "which gate is" should be --which is--.

Col. 10, line 9, "ther" should be --ther the--; and
line 9, "of the" should be --of--.

Signed and Sealed this

Fifth Day of February, 1991

*Attest:*

HARRY F. MANBECK, JR.

*Attesting Officer*    *Commissioner of Patents and Trademarks*